United States Patent [19]
Carlson

[11] Patent Number: 4,594,785
[45] Date of Patent: Jun. 17, 1986

[54] DISC BRAKE CALIPER PISTON DIAGNOSTIC GAUGE

[76] Inventor: Herman L. Carlson, 4242 Ridgemoor Dr., Traverse City, Mich. 49684

[21] Appl. No.: 713,813

[22] Filed: Mar. 20, 1985

[51] Int. Cl.$^4$ ............................................. G01B 3/22
[52] U.S. Cl. .............................. 33/172 R; 33/180 AT; 33/181 AT; 73/744; 116/283; 188/382
[58] Field of Search ............. 33/172 R, 169 R, 172 B, 33/173, 167, 180 AT, 180 R, 181 AT, 572, 542, 147 R, 147 K, 147 G, 147 H, 148 R, 148 E, 148 F, 148 H; 73/39, 121, 744, 745, 746; 116/283, DIG. 21

[56] References Cited
U.S. PATENT DOCUMENTS

| | | | |
|---|---|---|---|
| 1,611,062 | 12/1926 | Peebles | 33/172 R |
| 1,996,323 | 4/1935 | Chase et al. | 33/180 AT |
| 2,400,293 | 5/1946 | Dunn | 33/172 |
| 2,599,835 | 6/1952 | Johnson et al. | 33/172 |
| 2,632,955 | 3/1953 | Samuelson | 33/172 |
| 2,687,575 | 8/1954 | Acton et al. | 33/172 |
| 2,805,486 | 9/1957 | Barrett | 33/180 AT |
| 2,972,192 | 2/1961 | Atzberger | 33/180 |
| 3,075,290 | 1/1963 | Brook | 33/169 |
| 3,177,589 | 4/1965 | Peeler | 33/172 |
| 3,197,877 | 8/1965 | Aldeborgh | 33/169 |
| 3,359,642 | 12/1967 | Jessen et al. | 33/172 B |
| 3,386,173 | 6/1968 | Kiralfy | 33/172 B |
| 3,660,905 | 5/1972 | McFarland et al. | 33/148 R |
| 3,765,098 | 10/1973 | Schafer, Sr. | 33/181 AT |
| 3,829,979 | 8/1974 | Stewart | 33/180 AT |
| 3,854,216 | 12/1974 | Mosher | 33/181 AT |

Primary Examiner—Charles Frankfort
Assistant Examiner—Patrick R. Scanlon
Attorney, Agent, or Firm—George P. Pappas

[57] ABSTRACT

A disc brake caliper piston diagnostic gauge for the in situ testing and monitoring of a caliper piston which consists of a dial gauge having an externally threaded probe stem housing which extends outwardly therefrom into close proximity to a caliper piston when the gauge is in its operative position on a caliper housing. An anchor plate is threadably mounted upon the stem housing so as to be in abutting engagement with the inside surface of the outboard caliper housing when the gauge is in its operative position upon a caliper housing. A bias spring assembly is provided in threadable engagement with the stem housing so as to be adapted for selective operative engagement with a caliper piston. A contact indicator probe is provided which extends from the dial gauge through the stem housing member into operative engagement with the caliper piston so as to monitor the movement of the caliper piston and to translate the movement of the caliper piston into a visual indication on the dial gauge. Another embodiment of the disc brake caliper piston diagnostic gauge is provided for use with a solid wall outboard caliper housing which includes a hinged adapter anchor plate assembly which consists of a first caliper piston contact plate and a second outboard caliper housing contact plate and which is adapted to operatively engage the gauge so as to monitor the operation of a caliper piston.

4 Claims, 8 Drawing Figures

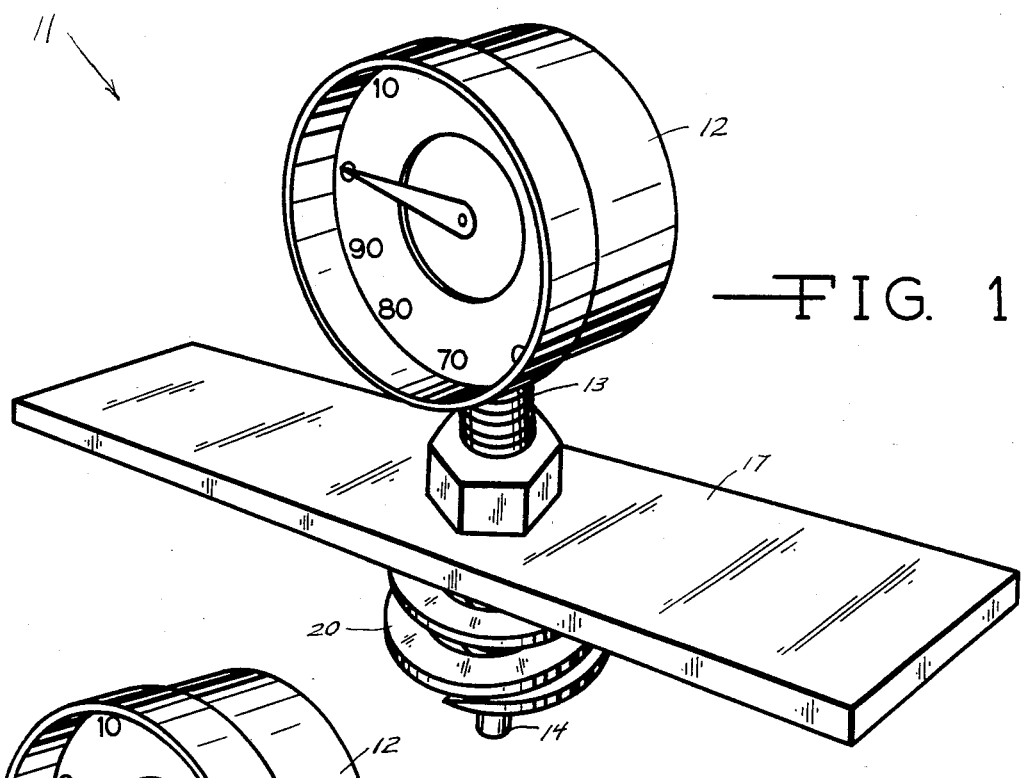
FIG. 1
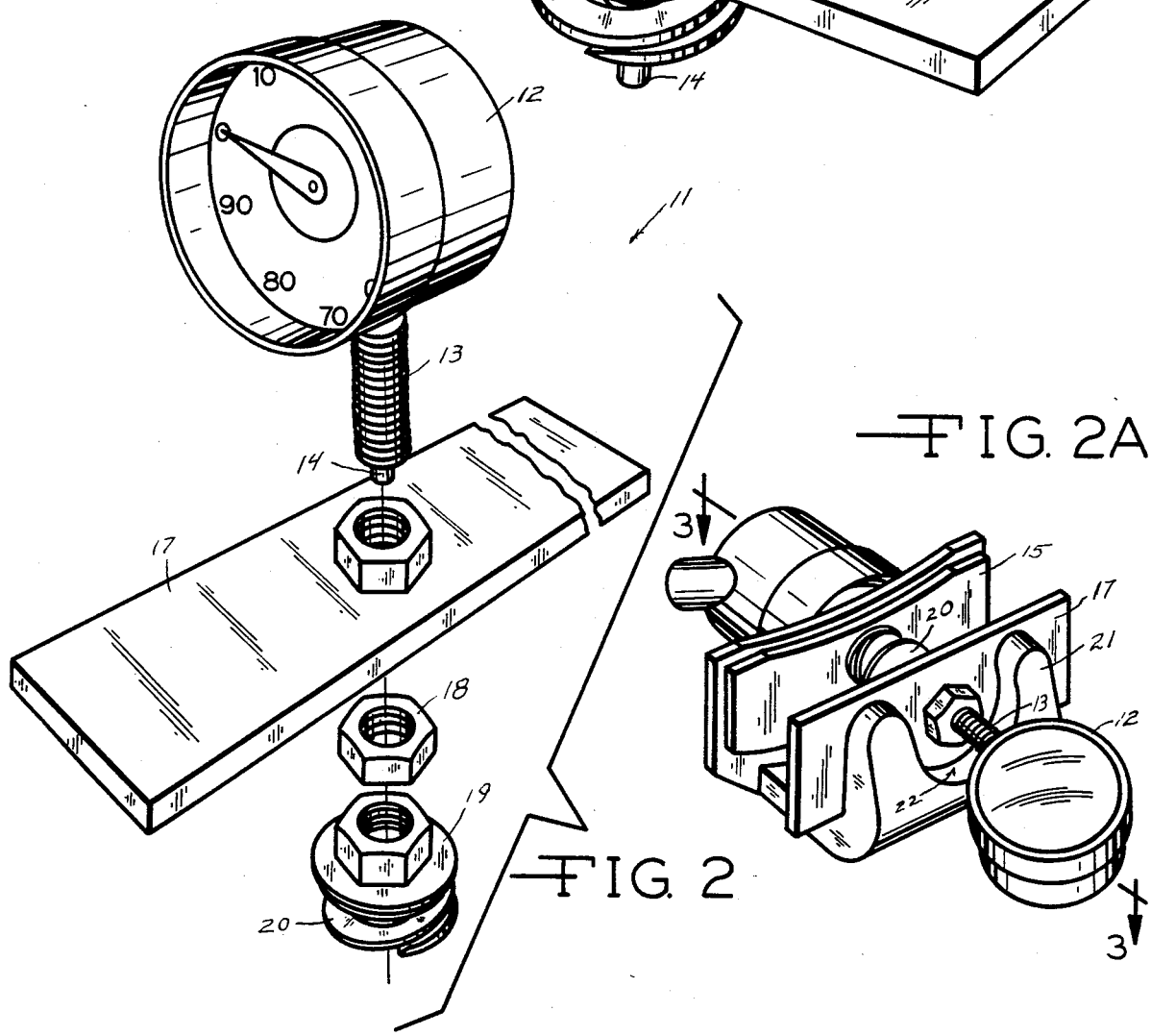
FIG. 2A
FIG. 2

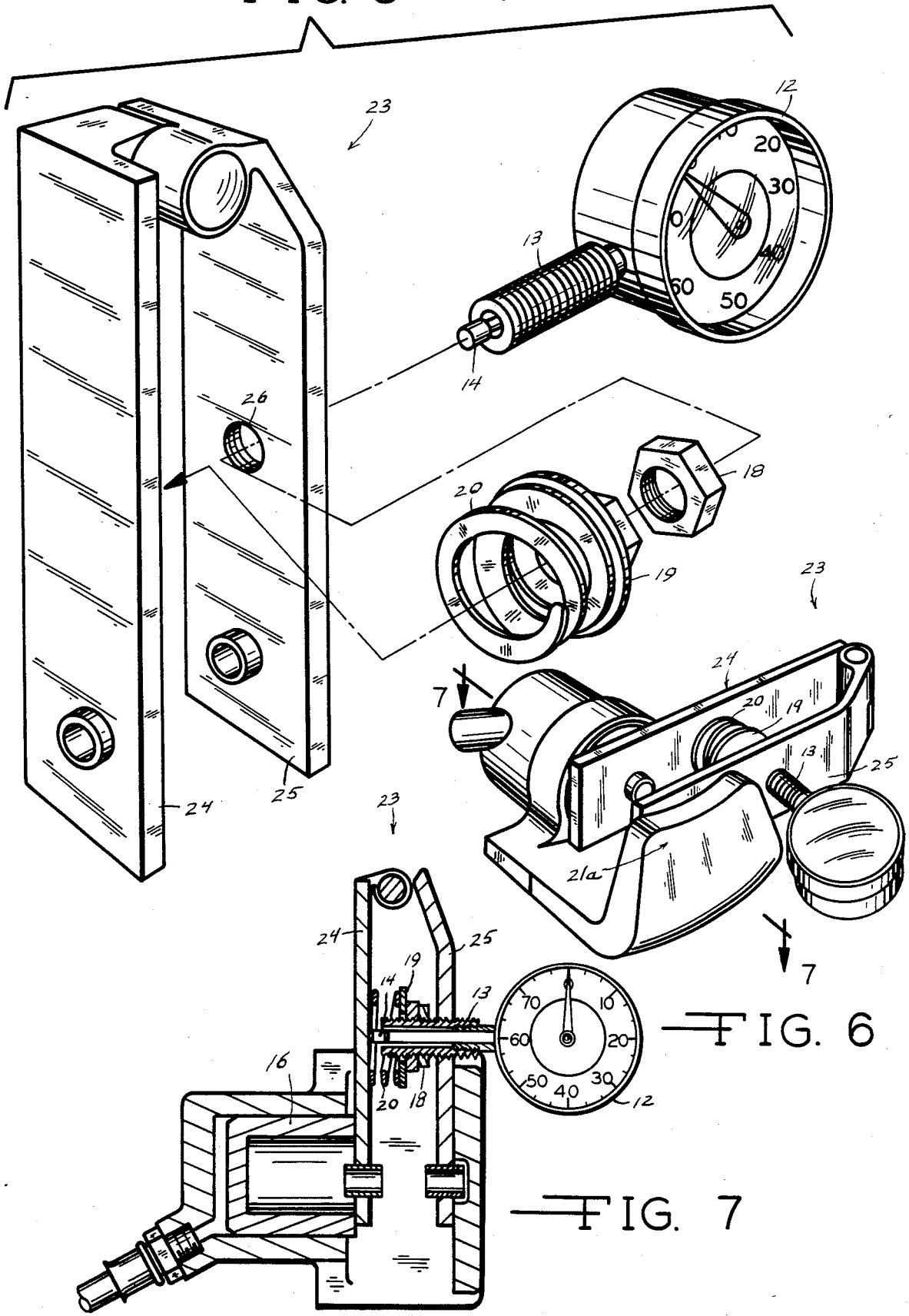

DISC BRAKE CALIPER PISTON DIAGNOSTIC GAUGE

This invention relates to a disc brake caliper piston diagnostic gauge for use in the in situ testing and monitoring of the operation of a caliper piston. More specifically, the disc brake caliper piston diagnostic gauge is designed to determine whether or not the disc brake caliper piston is operating freely or is sticking so as to improperly continue to exert drag pressure against the brake pads, thus causing excessive and uneven wear of the brake pads.

The disc brake caliper piston diagnostic gauge assembly comprises a dial gauge having an outwardly extending externally threaded contact probe stem housing which extends outwardly therefrom. A caliper housing anchor plate is threadably mounted on the contact probe stem housing so as to bear against the internal surface of the outboard brake caliper housing with the dial gauge positioned externally of the outboard brake caliper housing. A bias spring assembly is adjustably positioned on the contact probe stem housing for selective engagement with a caliper piston and associated pad so as to maintain the disc brake caliper piston diagnostic gauge assembly in its operative use position within the caliper housing. A contact indicator probe operatively extends from the dial gauge through the contact probe stem housing into selective engagement with the disc brake caliper piston and associated brake pad so as to monitor the relative movement thereof and to translate such movement into a visual indication on the dial gauge.

Another embodiment of the disc brake caliper piston diagnostic gauge is provided for use with solid wall caliper housings. A hinged caliper housing adapter anchor plate assembly is provided which comprises a first caliper piston contact plate and a second outboard caliper housing contact plate in a hinged substantially parallel spaced-apart position relative to the first caliper piston contact plate. The disc brake caliper piston diagnostic gauge is positioned on the hinged caliper housing adapter anchor plate assembly so that the contact probe stem housing is positioned in threaded engagement through the second outboard caliper housing contact plate and extends inwardly toward the first caliper piston contact plate so as to selectively position the contact indicator probe in selective operative engagement with the first caliper piston contact plate. The bias spring acts against the first caliper piston contact plate so as to selectively maintain it in operative engagement against the brake caliper piston while also acting against the second caliper housing plate to maintain it in operative engagement against the inside surface of the outboard caliper housing while the disc brake caliper piston diagnostic gauge selectively monitors the movement of the caliper piston.

A need has existed for a disc brake caliper piston diagnostic gauge which can be used in situ on the vehicle brake assembly so as to easily determine whether or not the caliper piston is operating freely so as to selectively return to its normal fully retracted position when brake pressure is released.

A further need has existed for a disc brake caliper piston diagnostic gauge which can be easily used in situ on the vehicle brake assembly so as to determine whether or not the caliper piston has rusted or has otherwise been damaged so that it fails to normally retract to its rest position when brake pressure is released, thus continuing to apply a residual continuous drag pressure against the brake pads which causes unnecessary wear and damage thereto.

Yet another need has existed for a disc brake caliper piston diagnostic gauge which can be easily utilized in situ to analyze the operation and condition of the caliper piston without the need to completely dismantle the brake caliper piston assembly.

It is therefore an object of this invention to provide a disc brake caliper piston diagnostic gauge which can be easily used in situ on the vehicle brake assembly so as to determine whether or not the caliper piston is operating freely to return to its normal fully retracted position when brake pressure is released.

Another object of this invention is to provide a disc brake caliper piston diagnostic gauge which can be easily used in situ so as to determine whether or not the caliper piston has rusted or has otherwise been damaged so that it fails to normally retract to its rest position, thus continuing to apply a residual continuous drag pressure against the brake pads.

Yet another object of this invention is to provide a disc brake caliper piston diagnostic gauge which can be easily utilized in situ to analyze the operation and condition of the caliper piston without the need to go to the trouble and expense of completely removing and dismantling the brake caliper piston assembly.

Other objects and advantages found in the construction of the invention will be apparent from a consideration of the following specification in connection with the appended claims and the accompanying drawings.

IN THE DRAWING

FIG. 1 is a perspective view of the disc brake caliper piston diagnostic gauge.

FIG. 2 is an exploded perspective view of the several components of the disc brake caliper piston diagnostic gauge.

FIG. 2A is a perspective view of the disc brake caliper piston diagnostic gauge in its operative use position on a caliper housing.

FIG. 5 is an exploded schematic view of a modified embodiment of the disc brake caliper piston diagnostic gauge showing the use of the hinged adapter plate assembly.

FIG. 6 is a perspective view of the modified embodiment of the invention in its operative use position on another type of caliper housing.

FIG. 7 is a schematic cross-sectional view of another type of caliper piston housing assembly and of the modified embodiment of the invention in operative engagement therewith.

DESCRIPTION

Figure 3:
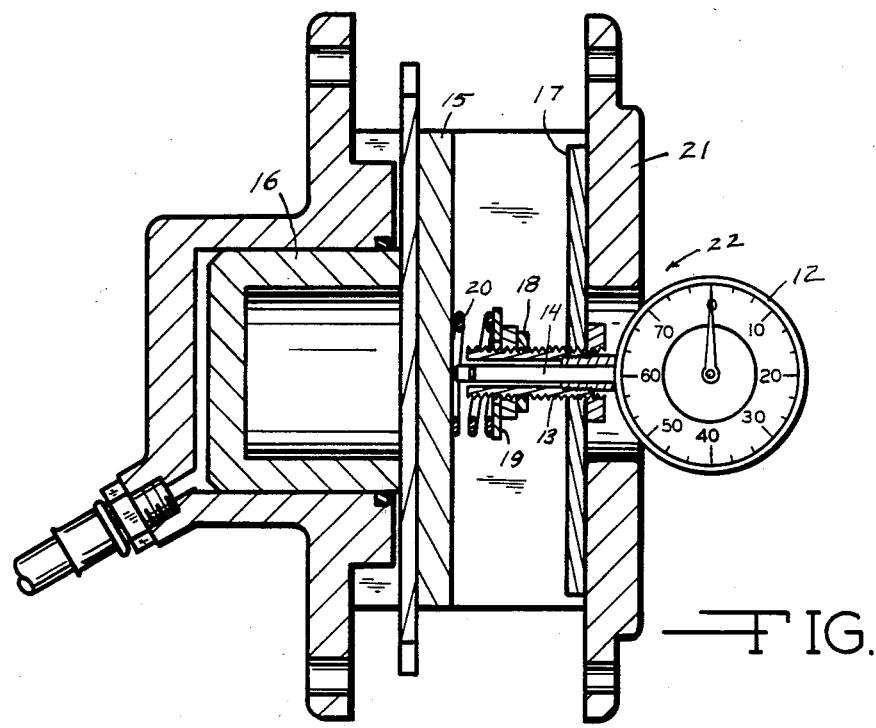
FIG. 3 is a schematic cross-sectional view of the caliper piston housing assembly and of the disc brake caliper piston diagnostic gauge in operative engagement with the normal fully retracted caliper piston and brake pad.

As shown generally in the drawings, a disc brake caliper piston diagnostic gauge 11 is provided for in situ use in association with a caliper piston housing in order to determine whether or not a caliper piston is sticking in use with resultant scoring of rotors and prematurely worn out brake pads.

The embodiment of the invention which is specifically shown in FIGS. 1 through 4 is adapted for in situ use in association with all single piston caliper housings having an opening or reces through the outboard casting. As shown in FIGS. 1 and 2, the disc brake caliper piston diagnostic gauge 11 comprises a standard dial guage 12 having an externally threaded hollow stem housing member 13 extending outwardly therefrom. A contact indicator probe 14 is operatively connected to the dial gauge 12 and extends outwardly therefrom through the hollow stem housing 13.

Figure 4:
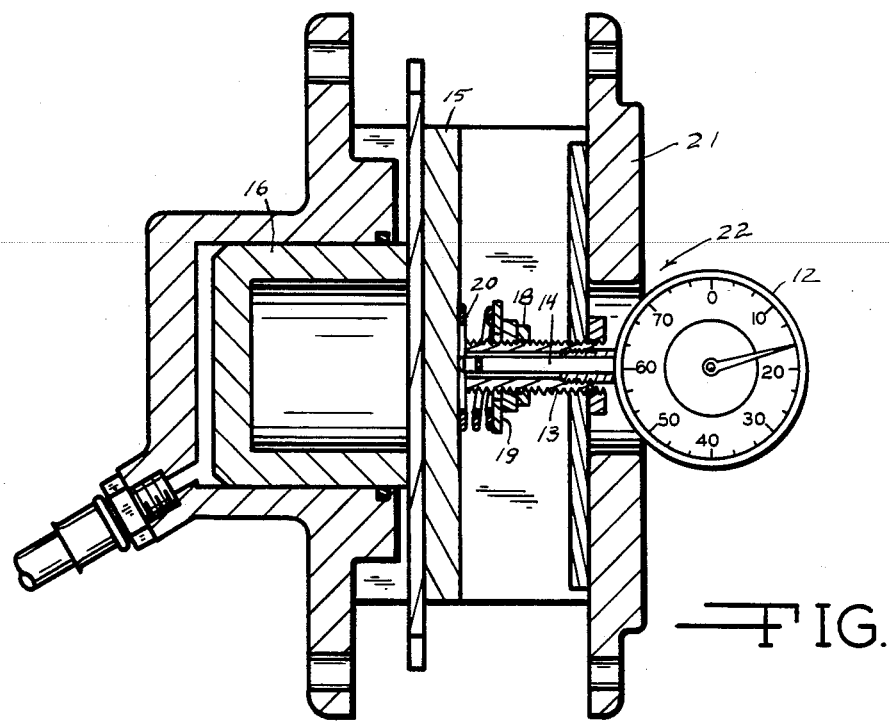
FIG. 4 is a schematic cross-sectional view of the caliper piston housing assembly and of the disc brake caliper piston diagnostic gauge in operative engagement with the caliper piston which has not fully retracted to its normal rest position.

As shown in FIGS. 3 and 4 the contact indicator probe 14 is adapted to extend outwardly beyond the stem housing 13 so as to operatively engage the inboard brake pad 15 which moves in direct response to corresponding movement of the caliper piston 16.

A caliper housing anchor plate 17 is threadably mounted on the stem housing 13 so as to be selectively adjustable therealong as will be hereinafter described.

A threaded adjustable locking back nut 18 is provided for selective mounting on the stem housing 13. A threadably adjustable bias spring bearing plate 19 is selectively mounted on the stem housing 13 so as to operatively engage a bias spring 20. As shown in FIGS. 2A, 3 and 4, the bias spring 20 is adapted to operatively engage the inboard brake pad 15 so as to springably bias the disc brake caliper piston gauge in its operative use position in association with the caliper housing. The locking back nut 18 acts to lock the bias spring bearing plate 19 in any selected position along the stem 13.

With the diagnostic gauge 11 in its operative use position, the anchor plate 17 is biased against the inner surface of the outboard caliper housing 21 so as to extend transversely across the recess opening 22 provided in the outboard caliper housing 21. As indicated, the stem 13 extends through the recess opening 22 so as to maintain the dial gauge 12 in an easily readable and accessible position outboard of the outboard caliper housing 21. With the diagnostic gauge 11 thus positioned, both the indicator probe 14 and the bias spring 20 are in operative engagement with the inboard pad 15 which correspondingly moves in response to movement of the caliper piston 16.

In operation, the brake caliper (not shown) is removed, but the inboard brake pad is left in place with the hydraulic line connected. The diagnostic gauge 11 is positioned as described above. The dial gauge 12 is adjusted until the dial indicator probe 14 touches the inboard pad 15. The dial is set to a zero reading as shown in FIG. 3. The foot brake pedal (not shown) is depressed until there is a 10 to 20 point reading on the dial gauge as shown in FIG. 4. The brake pedal is then released. If the caliper piston 16 is operating correctly, the caliper piston 16 should automatically return to its normal fully retracted position and the dial guage indicator should also return to zero. If it does not, this is a positive indication that the caliper piston is sticking and that it needs overhauling or replacing. The gauge 11 is then removed from the housing and the caliper and pads are assembled back on the rotor and the test operation is repeated on the calipers of the other brake.

Another embodiment of the disc brake caliper diagnostic gauge is shown in FIGS. 5 through 7 which is intended for use in association with a caliper housing having an outboard housing wall 21a which does not have an opening or recess therethrough. A hinged adapter plate assembly 23 is provided which includes a first caliper piston contact plate 24 and second outboard caliper housing contact plate 25 hinged thereto. The second outboard caliper housing contact plate 25 is configured to have a substantially parallel spaced-apart operative use relationship to the first caliper piston contact plate 24 as shown in FIGS. 6 and 7.

In use, the stem 13 is threadably and adjustably positioned through the threaded opening 26 provided through the second caliper housing plate 25. Thereafter bias spring 20 is threadably mounted on the stem 13 so as to selectively bear against the inside surface of the first caliper piston contact plate 24 while acting to maintain the second caliper housing contact plate 25 against the inside surface of the outboard housing 21a.

As previously described, the dial gauge 12 is adjusted so that the indicator probe 14 moves into operative engagement with the inside surface of the first caliper piston contact plate 24 with a resultant zero setting.

In use, the brake pedal is depressed to actuate the caliper piston 16 which in turn moves the first caliper piston contact plate 24 so as to move against the indicator probe 14 to register a positive reading on the dial gauge as previously described.

Upon release of the brake pedal, the caliper piston 16 should fully retract if it is operating properly with corresponding resultant zero indication on the dial gauge. If the reading on the dial gauge does not return to zero, it means that the caliper piston is sticking and must be overhauled or replaced.

It is thus seen that a simple and inexpensive disc brake caliper piston diagnostic gauge is provided which is adapted for in situ use and testing whereby it can be easily, quickly and inexpensively determined whether or not the caliper piston has to be replaced or repaired. The existence of an undetected defective caliper piston can result in recurring rotor and excessive brake pad wear with resultant unnecessary rotor and brake pad replacements.

Heretofore, faulty sticking caliper pistons have been difficult to detect witout expensive overhaul procedures. Further, inasmuch as disc brake calipers very seldom leak brake fluid, it has been difficult for a mechanic to determine if a caliper piston is working freely or is sticking. The main problem with sticking caliper pistons is that such sticking is caused by dirt, moisture, rusting or pitted pistons with resultant scored rotors and prematurely worn out brake pads.

The use of the instant invention not only solves the mechanic's problem in detecting the defective caliper piston, but enables the mechanic to demonstrate to the customer exactly what the problem is. This results in a satisfied customer with resultant profitable work for the mechanic.

SUMMARY

In summary, a disc brake caliper piston diagnostic gauge is provided for the in situ testing of caliper piston operation which includes a dial gauge having an outwardly extending externally threaded contact indicator probe stem housing member. The stem housing is adapted to extend from the dial gauge into axially aligned close proximity to a caliper piston and brake pad assembly when the disc brake caliper piston diagnostic gauge is in its in situ operative use position on a caliper housing. An elongate caliper outboard housing anchor plate is threadably mounted upon the stem housing member and is adapted for selective adjustable abutting engagement with the inside surface of an outboard caliper housing when the disc brake caliper piston diagnostic gauge is in its in situ operative use position upon a caliper housing. A bias spring assembly is provided in selective adjustable threadable engagement with the stem housing and is adapted for selective operative engagement with a caliper piston and brake pad positioned proximate thereto. A contact indicator probe is provided which extends from the dial gauge through the probe stem housing member. The indicator probe is adapted to selectively be in operative engagement with the caliper piston and associated brake pad so as to measure and monitor relative movement of the caliper piston within the caliper housing and to translate the relative movement of the caliper piston into a visual indication on the dial gauge.

The bias spring assembly comprises a bias spring bearing plate which is provided in selective adjustable threadable engagement upon the indicator probe stem housing and a bias spring which is provided on the indicator probe stem housing in operative engagement with the bias spring bearing plate. The bias spring is adapted for selective engagement with a caliper piston and associated brake pad positioned proximate thereto. However, it is considered to be within the scope of this invention that other bias spring assemblies which are well known in the art could be utilized as part of this invention.

Another embodiment of a disc brake caliper piston diagnostic gauge assembly is provided for the in situ testing of caliper piston operation which includes a hinged caliper housing adapter anchor plate assembly having a first caliper piston contact plate adapted for selective operative engagement with a caliper piston so as to move in response to corresponding movement thereof and a second outboard caliper housing contact plate in a hinged substantially parallel spaced-apart position relative to the first caliper piston contact plate. The second outboard caliper housing contact plate provided with a threaded stem housing engaging opening therethrough. A dial gauge is provided having an outwardly extending externally threaded contact indicator probe stem housing. The stem housing is adapted for selective adjustable threadable engagement through the stem housing engaging opening provided in the second caliper housing contact plate so as to be in close proximity to the first caliper piston contact plate. A bias spring assembly is provided in selective adjustable threadable engagement with the stem housing. The bias spring assembly is adapted for selective operative engagement with the first caliper piston contact plate. A contact indicator probe is provided which extends from the dial gauge through the probe stem housing. The contact indicator probe is adapted to selectively be in operative engagement with the first caliper piston contact plate so as to measure and monitor the corresponding relative movement of the caliper piston acting thereagainst and to translate the relative movement of the caliper piston into a visual indication on the dial gauge. Here again, the bias spring assembly utilized in this embodiment of the disc brake caliper piston diagnostic gauge assembly comprises a bias spring bearing plate which is provided in selective adjustable threadable engagement upon the indicator probe stem housing and a bias spring which is provided on the indicator probe stem housing in operative engagement with the bias spring bearing plate. The bias spring is adapted for selective engagement with the first caliper piston contact plate positioned proximate thereto.

Various other modifications of the invention may be made without departing from the priciple thereof. Each of the modifications is to be considered as included in the hereinafter appended claims unless these claims by their language expressly provide otherwise.

I claim:

1. In a disc brake caliper piston diagnostic gauge for the in situ testing of caliper piston operation, the combination comprising:

a dial gauge having an outwardly extending externally threaded contact indicator probe stem housing member, said stem housing member adapted to extend from said dial gauge into axially aligned close proximity to a caliper piston and brake pad assembly when said disc brake caliper piston diagnostic gauge is in its in situ operative use position on a caliper housing;

an elongate outboard caliper housing anchor plate threadably mounted upon said stem housing member, said outboard caliper housing anchor plate adapted for selective adjustable abutting engagement with the inside surface of an outboard caliper housing when the disc brake caliper piston diagnostic gauge is in its in situ operative use position upon a caliper housing;

a bias spring assembly provided in selective adjustable threadable engagement with said stem housing member said bias spring assembly adapted for selective operative engagement with a caliper piston and brake pad positioned proximate thereto; and a contact indicator probe extending from said dial gauge through said probe stem housing member, said indicator probe adapted to selectively be in operative engagement with the caliper piston and associated brake pad so as to measure and monitor relative movement of said caliper piston within the caliper housing and to translate the relative movement of the caliper piston into a visual indication on the dial gauge.

2. In the disc brake caliper piston diagnostic gauge of claim 1 wherein the said bias spring assembly comprises:

a bias spring bearing plate provided in selective adjustable threadable engagement upon said indicator probe stem housing member; and a bias spring provided on said indicator probe stem housing member in operative engagement with said bias spring bearing plate, said bias spring adapted for selective engagement with a caliper piston and associated brake pad positioned proximate thereto.

3. In a disc brake caliper piston diagnostic gauge assembly for the in situ testing of caliper piston operation, the combination comprising:

a hinged caliper housing adapter anchor plate assembly having a first caliper piston contact plate adapted for selective operative engagement with a caliper piston so as to move in response to corresponding movement thereof and a second outboard caliper housing contact plate in a hinged substantially parallel spaced-apart position relative to said first caliper piston contact plate, said second outboard caliper housing contact plate provided with a threaded stem housing engaging opening therethrough;

a dial gauge having an outwardly extending externally threaded contact indicator probe stem housing, said stem housing adapted for selective adjustable threadable engagement through said stem housing engaging opening provided in said second caliper housing contact plate so as to be in close proximity to said first caliper piston contact plate;

a bias spring assembly provided in selective adjustable threadable engagement with said stem housing, said bias spring assembly adapted for selective operative engagement with said first caliper piston contact plate; and a contact indicator probe extending from said dial gauge through said probe stem housing, said contact indicator probe adapted to selectively be in operative engagement with said first caliper piston contact plate so as to measure and monitor the corresponding relative movement of the caliper piston acting thereagainst and to translate the relative movement of the caliper piston into a visual indication on the dial gauge.

4. In the disc brake caliper piston diagnostic gauge assembly of claim 3 wherein the bias spring assembly comprises:

a bias spring bearing plate provided in selective adjustable threadable engagement upon said indicator probe stem housing; and a bias spring provided on said indicator probe stem housing in operative engagement with said bias spring bearing plate, said bias spring adapted for selective engagement with said first caliper piston contact plate positioned proximate thereto.

* * * * *